United States Patent [19]

Stewart

[11] Patent Number: 4,496,071

[45] Date of Patent: Jan. 29, 1985

[54] PRESSURE VESSELS HAVING END CLOSURES AND RETAINERS

[75] Inventor: Duncan R. Stewart, Newent, England

[73] Assignee: Valve Conversions Limited, Gloucester, England

[21] Appl. No.: 514,083

[22] Filed: Jul. 15, 1983

[30] Foreign Application Priority Data

Jul. 17, 1982 [GB] United Kingdom ............... 8220796

[51] Int. Cl.³ .......................................... B65D 45/32
[52] U.S. Cl. .................................. 220/319; 215/273; 220/327
[58] Field of Search ............... 220/319, 236, DIG. 19, 220/304, 327, 328, 274, 285; 215/274, 273, 213; 292/256.6, 256.63

[56] References Cited

U.S. PATENT DOCUMENTS

| 1,216,005 | 2/1917 | Spelling | 215/273 |
|---|---|---|---|
| 2,390,445 | 12/1945 | Mercier | 220/319 X |
| 2,437,632 | 3/1948 | Wolfram | 220/319 X |
| 2,645,513 | 7/1953 | Sterrett | 292/256.6 |
| 2,749,162 | 6/1956 | Humphrey | 220/319 X |
| 2,839,218 | 6/1958 | Zerbe | 292/256.6 X |
| 2,952,480 | 9/1960 | Prill et al. | 220/319 X |
| 3,437,230 | 4/1969 | Savory | 292/256.6 X |
| 3,494,652 | 2/1970 | Langland | 292/256.63 |
| 3,986,635 | 10/1976 | Niskin | 220/319 |
| 4,351,450 | 9/1982 | Summerfield | 220/319 |

FOREIGN PATENT DOCUMENTS

| 2339001 | 2/1974 | Fed. Rep. of Germany | 220/319 |
|---|---|---|---|
| 814423 | 6/1959 | United Kingdom | 220/319 |

Primary Examiner—Stephen Marcus
Assistant Examiner—Robert Petrik
Attorney, Agent, or Firm—William R. Hinds

[57] ABSTRACT

A pressure vessel 11 has a hollow member 10, an end closure 19 in telescope relationship with the hollow member, a flexible continuous element 26 extending around the end closure and operatively connecting the closure and the hollow member, a passage 14 for insertion and withdrawal of the continuous element, a removable plug 18 closing said passage for resisting removal of the continuous element, and annular seals 24, 25 between the hollow member and the end closure on both sides of the continuous element. The continuous element may be a length of wire spring.

9 Claims, 3 Drawing Figures

U.S. Patent     Jan. 29, 1985     4,496,071
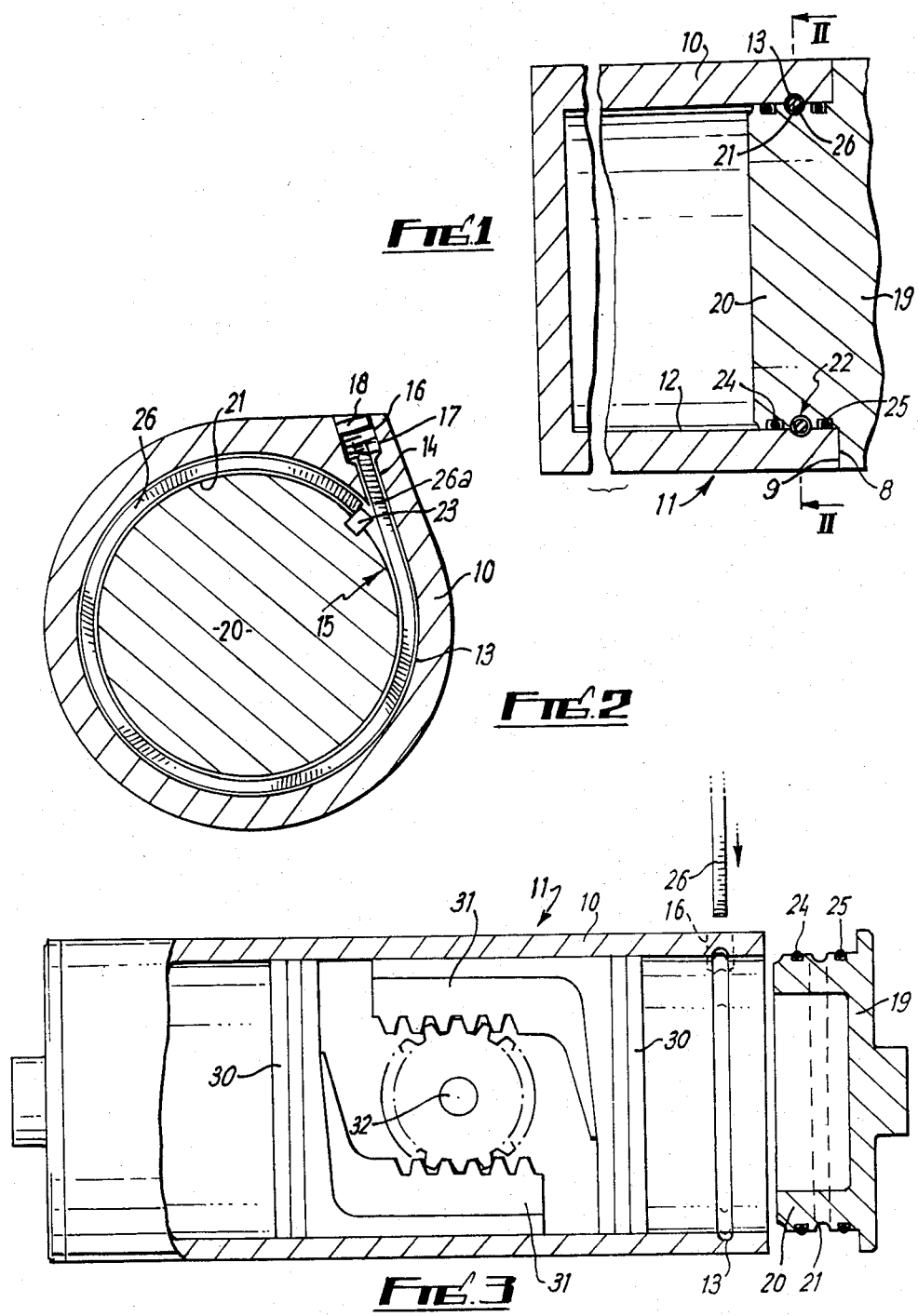

PRESSURE VESSELS HAVING END CLOSURES AND RETAINERS

This invention relates to pressure vessels.

Many pressure vessels consist of a hollow cylinder to which end caps are fitted. These caps are secured or attached to the cylinder for example by set screws, flanges and bolts or tie rods. These attachments have severe disadvantages in that they produce concentrations of stresses and more seriously they can, during attachment, be pretensioned to an unknown degree which can cause failure when the pressure is applied in the vessel. An alternative has been to secure the caps by means of a circlip. This is an improvement over the use of bolts but has disadvantages in that the type of circlip in general use is specifically designed for a particular size of end cap. Access to the circlip is usually required for assembly and the circlip is thus liable to tampering or adventitious removal. The circlip is also exposed and, therefore, could corrode in some environments.

According to this invention, a pressure vessel comprises a hollow member having an end closure in telescope relationship, flexible continuous means extending around the closure and operatively connecting the closure and the hollow member, a passage for insertion and withdrawal of the continuous means, a removable plug closing said passage for resisting removal of the continuous means, and annular seals between the hollow member and the end closure on both sides of the continuous means. The passage is preferably in the hollow member but the passage could be in the end closure. The continuous means may be within the hollow member.

The continuous means may comprise a circlip, which may take the form of a coiled spring.

The continuous means may be located in cooperating grooves in the closure and hollow member.

A stop may be provided for limiting movement of the continuous means in the cooperating grooves. The stop may be in the groove in the closure.

The plug may be shaped for engagement by a tool, for example the head may be recessed to receive a screw-driver or Allen key. The plug may be threadedly received in the passage. The plug may be wholly located in the passage. The end closure may be rotatable relative to the hollow member so that rotation of the closure in one sense on removal of the plug serves to partially discharge the continuous means through the passage means.

The seals may comprise o-rings.

The invention may be performed in various ways and one specific embodiment with possible modifications will now be described by way of example with reference to the accompanying drawings, in which:

FIG. 1 is an axial section through a pressure vessel;

FIG. 2 is a transverse section on the line 2—2 of FIG. 1; and

FIG. 3 is an axial section through an actuator for a valve.

Referring to the drawings, a wall 10 of a hollow pressure vessel or cylinder 11 has a groove 13 of semi-circular cross-section provided towards the end of its bore 12. A passage 14 is drilled through the wall 10 of the cylinder approximately tangential to the groove 13 and of the same diameter and breaking into the groove at 15 (FIG. 2). The passage 14 is enlarged at the outer end 16 and the enlarged portion is tapped to provide a screw thread 17 for the insertion of an externally threaded plug 18 which is wholly received in the passage.

An end cap or end fitting 19 has an extension 20 of a diameter which is a close fit telescoped in the bore 12 of the cylinder 11. A further semi-circular groove 21 is provided on the external surface of the extension 20 of the same dimensions as groove 13 and so positioned that when the end cap 19 is assembled to the cylinder the groove 21 is aligned with the cylinder groove 13 to form a circular-section annular groove 22 with access to the outer surface of the cylinder via passage 14. The groove 21 on the end cap is provided with a protrusion 23, for example a stud, extending into the groove 21 which is used when disassembling the device.

A first annular seal for example an O-ring 24, engaging with the surface of bore 12 is provided on the inward, pressure chamber, side of the groove 22 and a second annular seal, for example an O-ring 25, is provided on the outward side of the groove 22, respectively located in axially spaced peripheral grooves in the extension 20.

A flexible member in the form of a circlip 26, for example a length of close-coiled wire spring cut to the appropriate length, is inserted through the access hole 14 and pushed in until the end contacts the protrusion 23. At this stage the protrusion 23 is at a position angularly clockwise from that shown in FIG. 2. The end fitting 19 is then rotated, to move the protrustion 23 clockwise in FIG. 2, whilst the flexible circlip 26 is fed in. The circlip is fully engaged when the protrusion 23 contacts the circlip portion 26a in the access hole (FIG. 2). A length of circlip is left within the access hole 14 to provide a lead for disassembly, which is accomplished by rotating the end fitting 19 anti-clockwise as seen in FIG. 2 so that the protrusion 23 automatically discharges the circlip through the passage 14, the plug 18 having been removed.

On assembly, shoulder 9 on cap 19 engages end face 8 on the wall 10.

On assembly, the plug 18 is screwed into the threaded portion of the access hole. This plug can be provided with a specially shaped socket in one end requiring cooperation with an appropriately-shaped tool so that tampering or adventitious removal is difficult.

With this arrangement the following advantages are obtained:

(a) The circlip 26 provides a complete shear surface against the pressure in the vessel 11 with a minimum of stress-creating features;

(b) The circlip cannot easily be removed without a special tool, thus reducing the possibility of error or malicious damage;

(c) The annular chamber 22 containing the circlip 26 is completely sealed from the pressure vessel and from environmental conditions exterior to the cylinder and is protected from corrosion;

(d) The method described is simple and provides a simple manufacturing design which reduces the cost of manufacture.

FIG. 3 shows the invention applied to an actuator for a valve, the actuator comprising opposed pistons 30 having diametically opposed toothed portions 31 cooperable with a toothed output shaft 32 which extends to the exterior of the pressure cylinder 10 and has dogs at its ends for cooperation for example with a valve to be operated. Adjustable stops may be provided for limiting the movement of the shaft in the opposed rotary senses. The cylinder has end caps 19 and the pistons are reciprocable by air pressure supplied to the cylinder. The pistons could be moved by air pressure in one direction and by a spring in the end cap in the opposite direction.

I claim:

1. A pressure vessel comprising two members in telescopic relationship, the two members comprising a hollow member and an end closure, flexible continuous means extending around the end closure and located in cooperating grooves in the two members so as to operatively connect the end closure and the hollow member for resisting separating movment therebetween, a passage in one of said two members and extending from the said groove in the one member to the exterior of said one member for insertion and withdrawal of the continuous means, a removable plug closing said passage for resisting removal of the continuous means and for sealing the passage from the exterior, and annular seals between the hollow member and the end closure on both sides of the continuous means.

2. A pressure vessel as claimed in claim 1, in which the passage is in the hollow member.

3. A pressure vessel as claimed in claim 1, in which the continuous means is within the hollow member.

4. A pressure vessel as claimed in claim 3, in which the continuous means comprises a coiled spring.

5. A pressure vessel as claimed in claim 1, including a stop for limiting movement of the continuous means in the cooperating grooves.

6. A pressure vessel as claimed in claim 1, in which the plug is shaped for engagement by a tool and is wholly in the passage.

7. A pressure vessel as claimed in claim 1, in which the seals are O-rings.

8. A pressure vessel as claimed in claim 1, in the form of a valve actuator comprising reciprocable pistons in the hollow member cooperable with an output shaft extending to the exterior of the hollow member.

9. A pressure vessel as claimed in claim 5 wherein said hollow member and said end closure are relatively rotatable, and wherein said stop is carried by the one of said hollow members which does not contain said passage, said stop projecting into the cooperating groove of the member by which the stop is carried.

* * * * *